(12) United States Patent
Cote et al.

(10) Patent No.: US 8,308,179 B2
(45) Date of Patent: Nov. 13, 2012

(54) BICYCLE WITH INTERNAL STORAGE SYSTEM

(75) Inventors: Mark Cote, Aptos, CA (US); Jean-Luc Callahan, San Jose, CA (US); Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/087,044

(22) Filed: Apr. 14, 2011

(65) Prior Publication Data

US 2012/0261897 A1 Oct. 18, 2012

(51) Int. Cl.
*B62K 3/02* (2006.01)

(52) U.S. Cl. .................. 280/288.3; 280/288.4

(58) Field of Classification Search .......... 224/414; 280/201, 288.1, 288.3, 288.4
See application file for complete search history.

(56) References Cited

U.S. PATENT DOCUMENTS

| | | | | |
|---|---|---|---|---|
| 679,512 | A | * | 7/1901 | Rock .............................. 280/201 |
| 2,322,841 | A | * | 6/1943 | Foster ........................... 280/783 |
| 3,269,480 | A | * | 8/1966 | Kirby ............................. 180/225 |
| 4,513,986 | A | | 4/1985 | Trimble |
| RE33,295 | E | | 8/1990 | Trimble |
| 5,328,194 | A | | 7/1994 | Buckler |
| 5,851,017 | A | | 12/1998 | Eden |
| 7,819,413 | B2 | | 10/2010 | White |

* cited by examiner

*Primary Examiner* — Tony Winner
(74) *Attorney, Agent, or Firm* — Michael Best & Friedrich LLP (57) ABSTRACT

A bicycle including a front wheel, a rear wheel, and a frame supported on the front and rear wheels. The frame includes a hollow frame member having a wall with an opening, and a flexible bladder positioned in the hollow frame member. A stiffening member is positioned along at least a portion of the bladder to facilitate insertion of the bladder through the opening and into the frame member. The bicycle further includes a collar coupled to the open end of the bladder with at least a portion of the collar being positioned on an outer surface of the frame member. The bladder includes a first portion adjacent the open end and generally aligned with a first axis and a second portion distal to the open end and generally aligned with a second axis that is non-parallel to the first axis.

25 Claims, 8 Drawing Sheets

BICYCLE WITH INTERNAL STORAGE SYSTEM

BACKGROUND

The present invention relates generally to bicycles, and more specifically to systems for storing items inside a bicycle frame.

In order to provide storage for water, compressed air, spare parts, tools, or other items, bicycles commonly include a frame having a storage system. Such storage systems commonly include a hatch that provides access to the storage system.

SUMMARY OF THE INVENTION

The present invention provides a bicycle including a front wheel, a rear wheel, and a frame supported on the front and rear wheels. The frame includes a hollow frame member (e.g., a top tube) having a wall with an opening (e.g., in a top surface of the frame member). The bicycle further includes a storage system in the form of a flexible bladder positioned in (e.g., and removable from) the hollow frame member and having an open end. In one aspect of the invention, a stiffening member is positioned along at least a portion of the bladder to facilitate insertion of the bladder through the opening and into the frame member. For example, the stiffening member can be coupled to the bladder along a majority of a length of the stiffening member (e.g., on an exterior of the bladder). Preferably, the stiffening member is a hollow tube that is in communication with an interior of the bladder such that the hollow tube acts as a drinking tube.

In another aspect of the invention, the bicycle further includes a collar coupled to the open end of the bladder with at least a portion of the collar being positioned on an outer surface of the frame member. Preferably, the collar is more rigid than the bladder, and an outer surface of the collar is flush with an outer surface of frame member. In one embodiment, the bicycle further includes a hollow tube coupled to the bladder, and a portion of the hollow tube is positioned through an aperture in the collar. If desired, the bicycle can further include a cover movable relative to the collar between a closed position where the open end is substantially covered and an open position where the open end is substantially uncovered. Preferably, the cover is coupled to the collar in both the open and closed positions. The cover can include a retainer secured to the hollow tube.

In yet another aspect of the invention, the bladder includes a first portion adjacent the open end and generally aligned with a first axis and a second portion distal to the open end and generally aligned with a second axis that is non-parallel to the first axis. Preferably, the hollow frame member includes a top tube and the frame further includes a down tube, and the bladder extends from the opening in the top tube and through at least a portion of the down tube. In order to align with the first and second axes, a longitudinal edge of bladder can be curved. For example, a side profile of a front longitudinal edge of bladder can be convex, and a side profile of a rear longitudinal edge of bladder can be concave.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
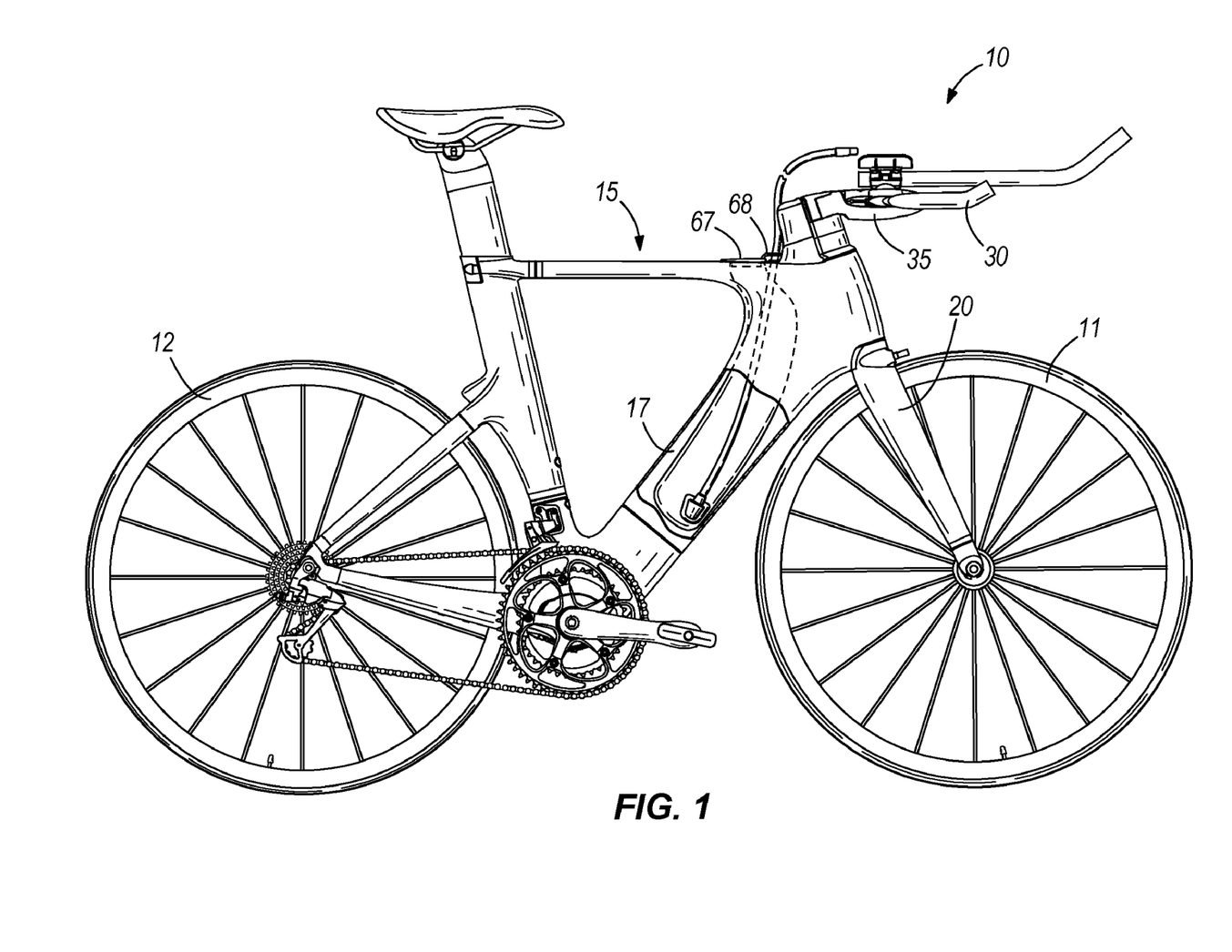
FIG. 1 is a perspective view of a bicycle embodying the present invention.

FIG. 1 illustrates a bicycle 10 including a front wheel 11, a rear wheel 12, and a frame 15 supported on the front and rear wheels 11, 12. The frame 15 includes an internal storage system 17 defined within a hollow frame member. The bicycle 10 also includes a front fork 20 supported by the front wheel 11 and having a steerer tube 25 (FIG. 2) rotationally coupled to the frame 15. The bicycle 10 further includes a handlebar 30 that is coupled to the front fork 20 by a stem 35.

Figure 2:
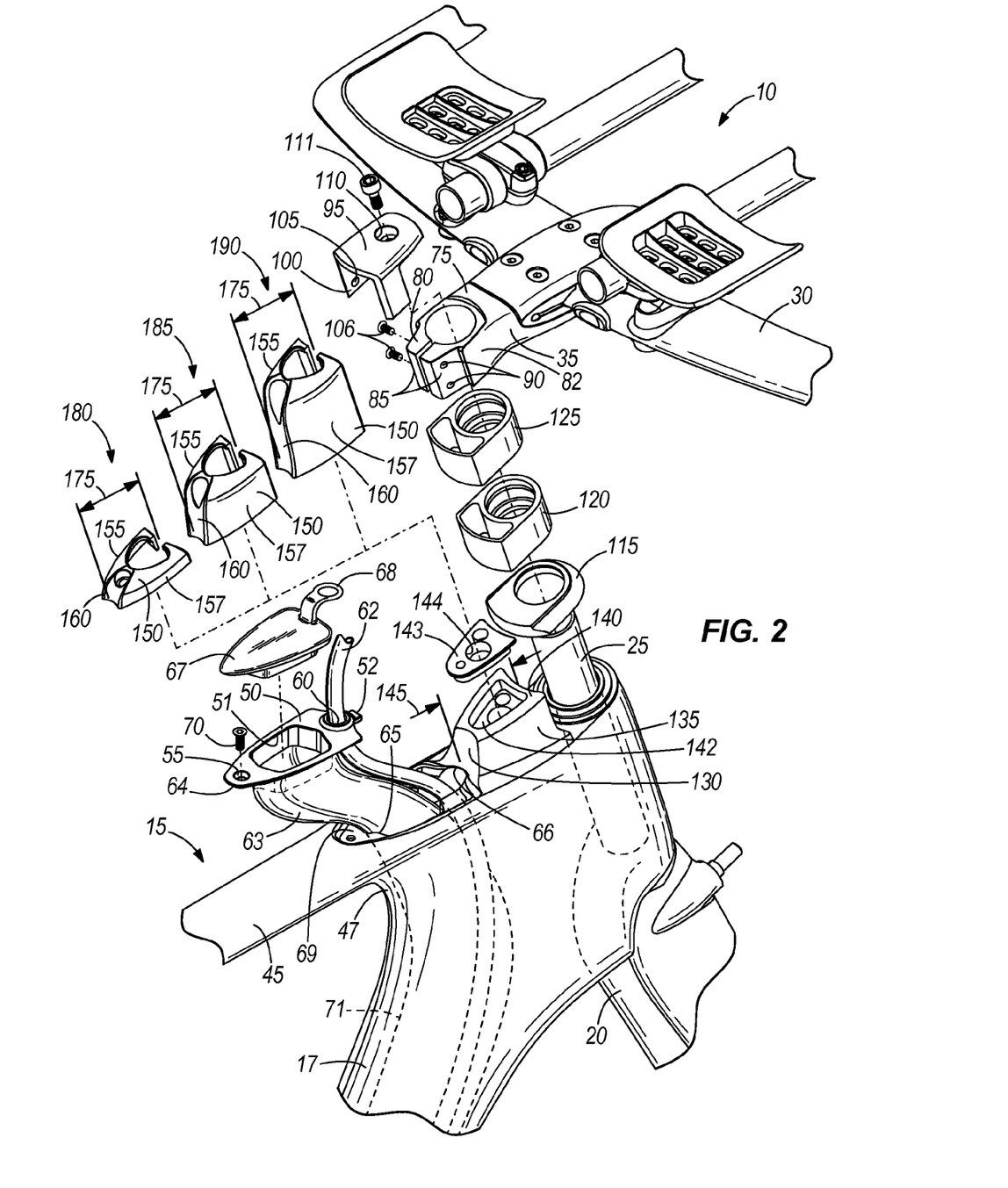
FIG. 2 is an exploded perspective view of a front portion of the bicycle in FIG. 1, illustrating an internal storage system including a first construction of a storage system.
Figure 3:
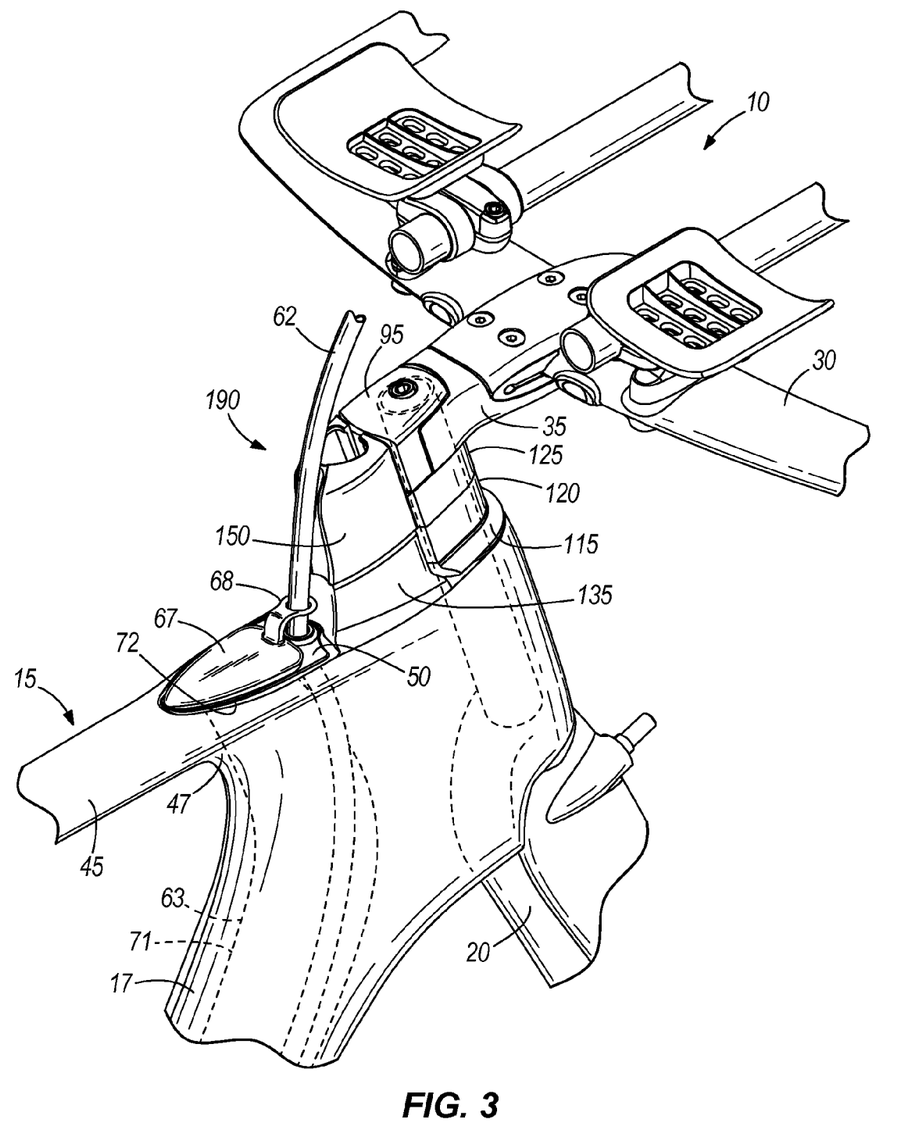
FIG. 3 is an assembled perspective view of the front portion of the bicycle in FIG. 2.

Referring to FIGS. 2 and 3, the illustrated frame 15 includes the hollow frame member in the form of a top tube 45 and a down tube 47 of the frame 15. Alternatively, the hollow frame member can be other frame tubes. A top surface of the top tube 45 includes an opening 65 that facilitates access to an interior of both the top tube 45 and the down tube 47. The top tube 45 further includes a groove 66, a recessed portion 69 around the opening 65, and a threaded hole 73.

A storage system 71 is disposed within the internal storage system 17. The storage system 71 includes a collar 50 having a filling port 51, a protrusion 52, a first aperture 55, and a second aperture 60. The protrusion 52 is dimensioned to fit into the groove 66, and the collar 50 is dimension to pivot downward into the opening 65 and recessed portion 69 such that an outer surface of the collar 50 is substantially flush with an upper or outer surface of the top tube 45. A seal 64 is positioned between the collar 50 and the recessed portion 69 to form a sealing engagement between the collar and the recessed portion 69. The collar 50 is held in position relative to the top tube 45 by the protrusion 52 interacting with a fastener 70 positioned through the first aperture 55 and into the threaded hole 73 in the frame 15. Alternatively, the aperture 55 and the fastener 70 can be omitted and a first magnetic fastener (not shown) can be connected to the collar 50 and a second magnetic fastener (not shown) can be connected to the top tube 45 for magnetic engagement with the first magnetic fastener. The second aperture 60 in the collar 50 is dimensioned to receive a hollow tube 62 that is configured to be used as a drinking tube.

The storage system further includes a cover 67 that can be manipulated between open and closed positions. In the closed position, the cover 67 forms a sealing engagement with the filling port 51. In the open position, the cover 67 opens the filling port 51 to facilitate adding fluid through the filling port 51. The cover 67 includes a retainer 68 that acts to tether the cover 67 to the hollow tube 62, and thus couples the cover 67 to the collar 50. In this manner, the cover 67 is coupled to collar 50 when the cover 67 is in both the open and closed positions.

With continued reference to FIGS. 2 and 3, the storage system 71 further includes a flexible bladder 63 having an open end 72 secured to the collar 50 such that the interior of the bladder 63 is accessible through the filling port 51. When the collar 50 is positioned in the opening 65, the flexible bladder 63 is positioned within the internal storage system 17 in the top tube 45 and the down tube 47 of the frame 15. The hollow tube 62 is fluidly coupled to the bladder 63 to facilitate withdrawal of fluid from the bladder through the hollow tube 62.

Referring to FIG. 2, the stem 35 includes a top surface 75 having a recessed portion 80 and a pair of side surfaces 82 having a pair of opposing grooves 85, each with a pair of threaded holes 90. A cover 95 having a corresponding pair of opposing inner surfaces 100 with holes 105 and an aperture 110 is dimensioned to be received in the recessed portion 80 such that the holes 105 are aligned with the holes 90 of the stem 35. Two fasteners 106 are received by the holes 90 to clamp the stem 35 to the steerer tube 25. Note that a tool (e.g., an allen wrench—not shown) can access the fasteners 106 through the holes 105 in the cover 95. The aperture 110 is dimensioned to receive a top bolt 111 for axially tightening the stem 35 to the steerer tube 25. The stem 35 is supported by a base 115 dimensioned to be substantially flush with the sides 82 of the stem 35. The base 115 mounts to the frame 15. A first stem spacer 120 and second stem spacer 125, also dimensioned to be substantially flush with the sides 82 of the stem 35, can be mounted on the base 115 for adjusting the height of the top surface 75 of the stem 35. For a low stem 35 height, both the first and second stem spacers 120, 125 are omitted (see FIG. 4). For a mid stem 35 height, the second stem spacer 125 is omitted (see FIG. 5). For a high stem 35 height, both the first and second stem spacers 120, 125 are included (see FIG. 6).

A first fairing member 130 includes a side surface 135 that defines an aerodynamic trailing edge. The first fairing member 130 further includes a first outer surface 140 having a recess 142 that receives a cover 143 having an aperture 144. The aperture 144 is dimensioned to receive a cable (not shown), such as a brake cable positioned in a brake cable housing. The first outer surface 140 faces away from the top tube 45. The first fairing member 130 includes a first front-to-back dimension 145. The first fairing member 130 is coupled to the top tube 45 such that the first fairing member 130 protrudes outward from the top tube 45. The first fairing member 130 is positioned immediately behind the stem 35 and entirely rearward of the steerer tube 25. The illustrated first fairing member 130 is integrally formed with the top tube 45.

A second fairing member 150 includes an upper surface 155 that is substantially flush with the top surface 75 of the stem 35 and a side surface 157 that is substantially flush with the side surface 82 of the stem 35. The second fairing member 150 further includes a concave tail edge 160. The second fairing member 150 includes a second front-to-back dimension 175, where the first front-to-back dimension 145 is greater than the second front-to-back dimension 175. The second fairing member 150 is detachably mounted on the first outer surface 140 of the first fairing member 130 such that the side surface 135 of the first fairing member 130 is exposed. The second fairing member 150 is positioned immediately behind the stem 35 and entirely rearward of the steerer tube 25. Second fairing member 150 constructions of varying height are shown including a low second fairing member 180 for use with the low stem height configuration, a mid second fairing member 185 for use with the mid stem 35 height configuration, and a high second fairing member 190 for use with the high stem 35 height configuration. In the illustrated design, only one of the low, mid, and high second fairing members 180, 185, 190 can be used at a time.

Figure 4:
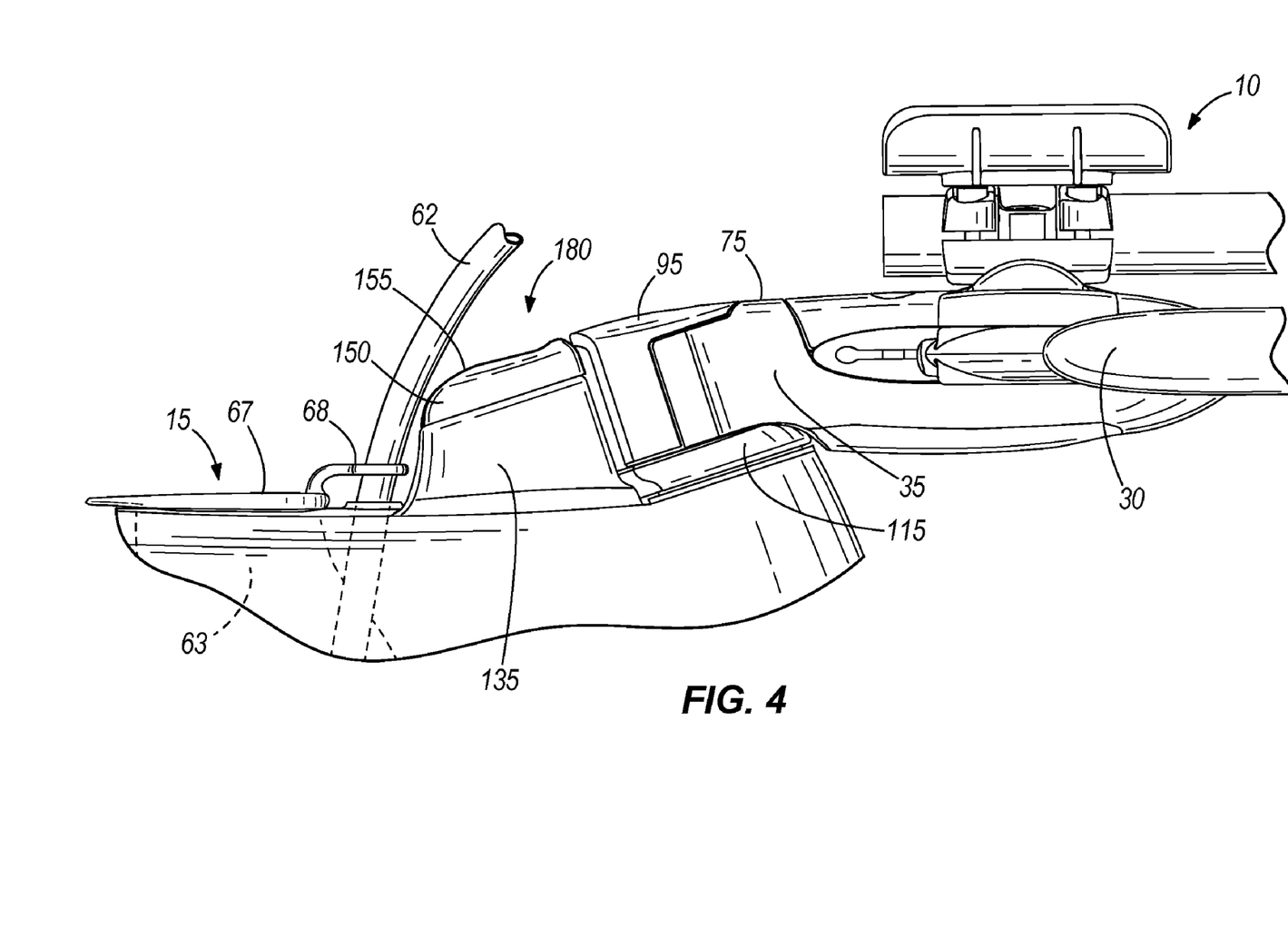
FIG. 4 is an assembled side view of the front portion of the bicycle in FIG. 2, incorporating a first construction of a fairing member.

FIG. 4 illustrates use of the low second fairing member 180 when the stem 35 is in the low stem height configuration. In this arrangement, the first and second stem spacers 120, 125 (FIG. 2) are omitted and the stem 35 mounts directly on the base 115. Note that the upper surface 155 of the low second fairing member 180 is substantially flush with the top surface 75 of the stem 35.

Figure 5:
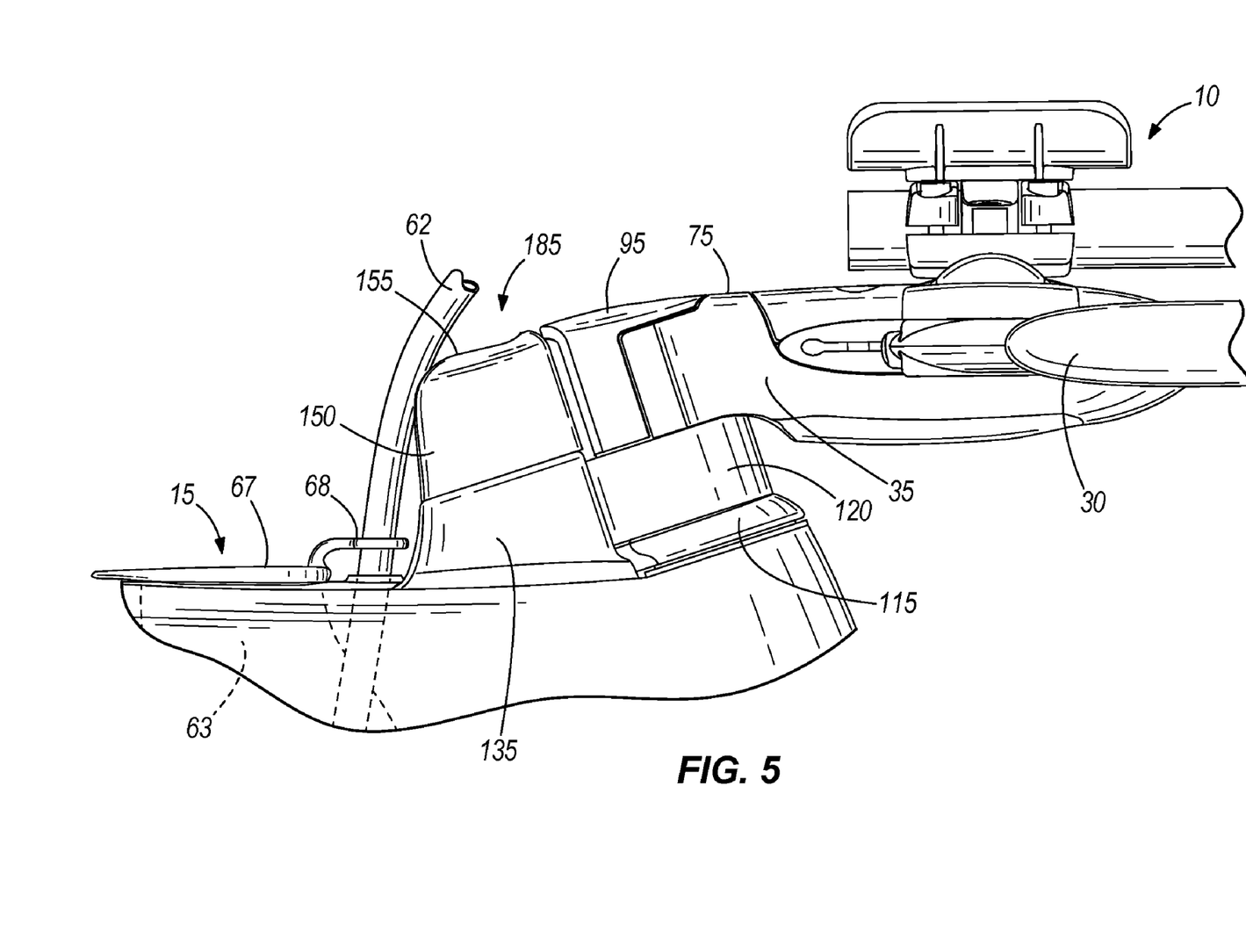
FIG. 5 is an assembled side view of the front portion of the bicycle in FIG. 2, incorporating a second construction of the fairing member.

FIG. 5 illustrates use of the mid second fairing member 185 when the stem 35 is in the mid stem height configuration. In this arrangement, the second stem spacer 125 (FIG. 2) is omitted and the stem 35 mounts on the first stem spacer 120, which mounts on the base 115. Note that the upper surface 155 of the mid second fairing member 185 is substantially flush with the top surface 75 of the stem 35.

Figure 6:
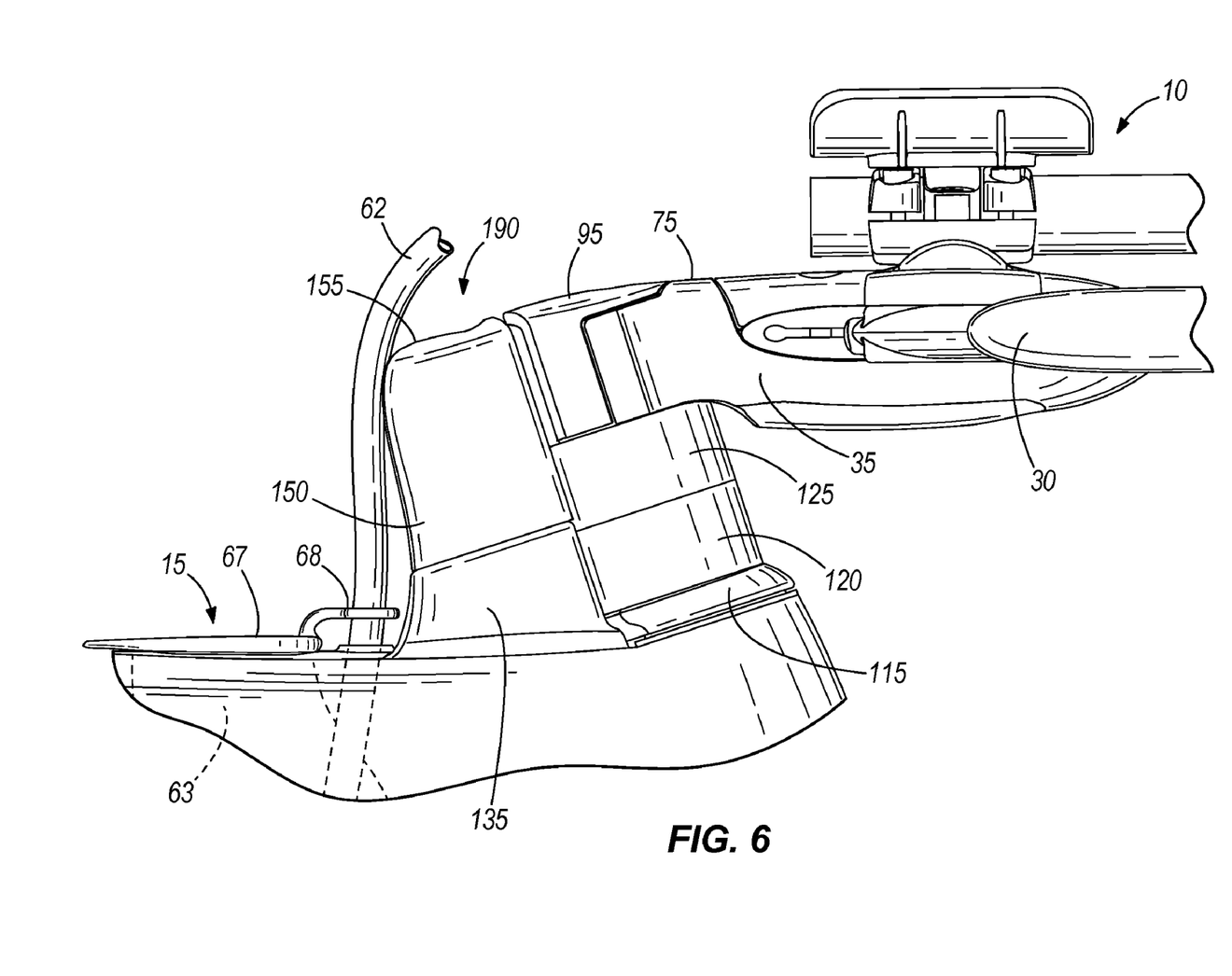
FIG. 6 is an assembled side view of the front portion of the bicycle in FIG. 2, incorporating a third construction of the fairing member.

FIG. 6 illustrates use of the high second fairing member 190 when the stem 35 is in the high stem height configuration. In this arrangement, both of the first and second stem spacers 120, 125 are included and the stem 35 mounts on the second stem spacer 125, which mounts on the first stem spacer 120, which mounts on the base 115. Note that the upper surface 155 of the high second fairing member 190 is substantially flush with the top surface 75 of the stem 35.

In operation of the storage system 71, the hollow tube 62 is secured to a lower portion of the bladder 63 and is threaded through the aperature 60 in the collar 50 and through the retainer 68 of the cover 67. The hollow tube 62 and the bladder 63 are both inserted through the opening 65 in the top tube 45 and positioned within the internal storage system 17 in the top tube 45 and the down tube 47 of the frame 15. The hollow tube 62 is semi-rigid and acts as a stiffening member that assists with pushing the bladder 63 into position. The protrusion 52 of the collar 50 is positioned in the groove 66 of the opening 65, and the collar 50 is positioned such that the seal 64 sealingly engages the recessed portion 69. The fastener 70 is insereted through the first aperture 55 and into the frame 15 to hold the collar 50 in position relative to the top tube 45. Alternatively, the collar 50 can be magnetically engaged with the top tube 45 using the first and second magnetic fasteners. In the installed orientation shown in FIG. 3, the hollow tube 62 is positioned at least partially within the concave tail edge 160 of the second fairng member 190, which is believed to improve the aerodynamics of the assembly. Water or another hydrating fluid (e.g., an electrolyte solution) is poured into the filling port 51 of the collar 50. The water or other fluid can be poured using a water bottle (not shown) while the bicycle 10 is in motion. The cover 67 is positioned to sealingly engage the filling port 51 of the collar 50 while the retainer 68 secures the cover 67 to the hollow tube 62 or to the collar 50. A user can drink water or another fluid from the hollow tube 62 while the bicycle 10 is stopped or in motion. The storage system 71 can be removed from the internal storage system 17 for easy cleaning and replacement.

Figure 7:
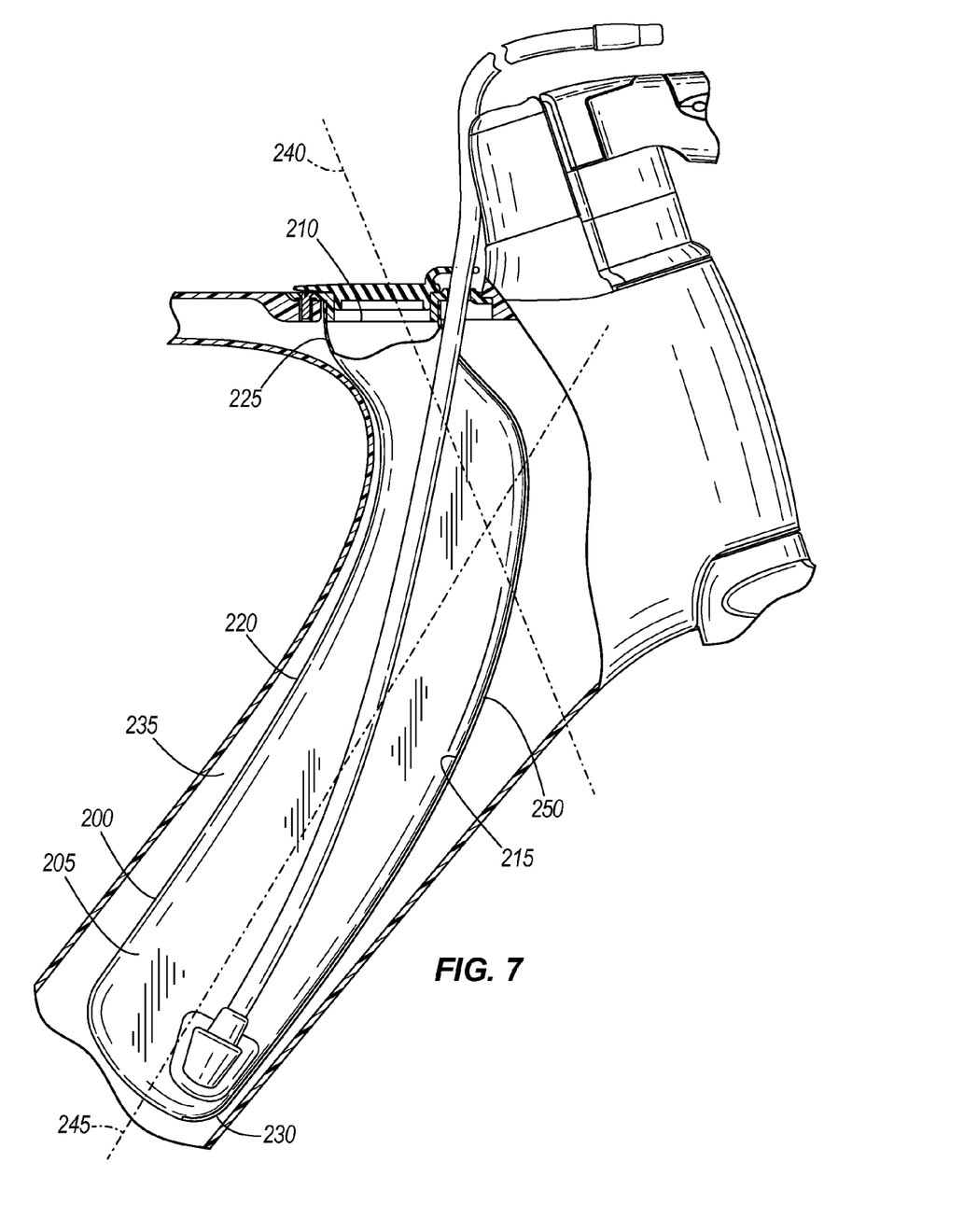
FIG. 7 is a sectioned side view of a front portion of the bicycle in FIG. 1, illustrating the internal storage system including a second construction of the storage system.

FIG. 7 illustrates a storage system 200 according to another embodiment. The storage system 200 includes a flexible bladder 205 having an open end 210, a front longitudinal edge 215, and a rear longitudinal edge 220. The flexible bladder 205 further includes a first portion 225 adjacent the open end 210 and a second portion 230 distal to the open end 210. The first portion 225 is generally aligned with a first axis 240, and the second portion 230 is generally aligned with a second axis 245 that is non-parallel to the first axis 240. The front and rear longitudinal edges 215, 220 are curved such that a side profile of the front longitudinal edge 215 is convex and a side profile of the rear longitudinal edge 220 is concave. A stiffening member 250 (e.g., a wire) is coupled to the front longitudinal edge 215 of the flexible bladder 205. In this embodiment, the stiffening member 250 is coupled to an exterior of the bladder along a majority of a length of the stiffening member. In operation, the stiffening member 250 assists with pushing the flexible bladder 205 into position within the internal storage system 235.

Figure 8:
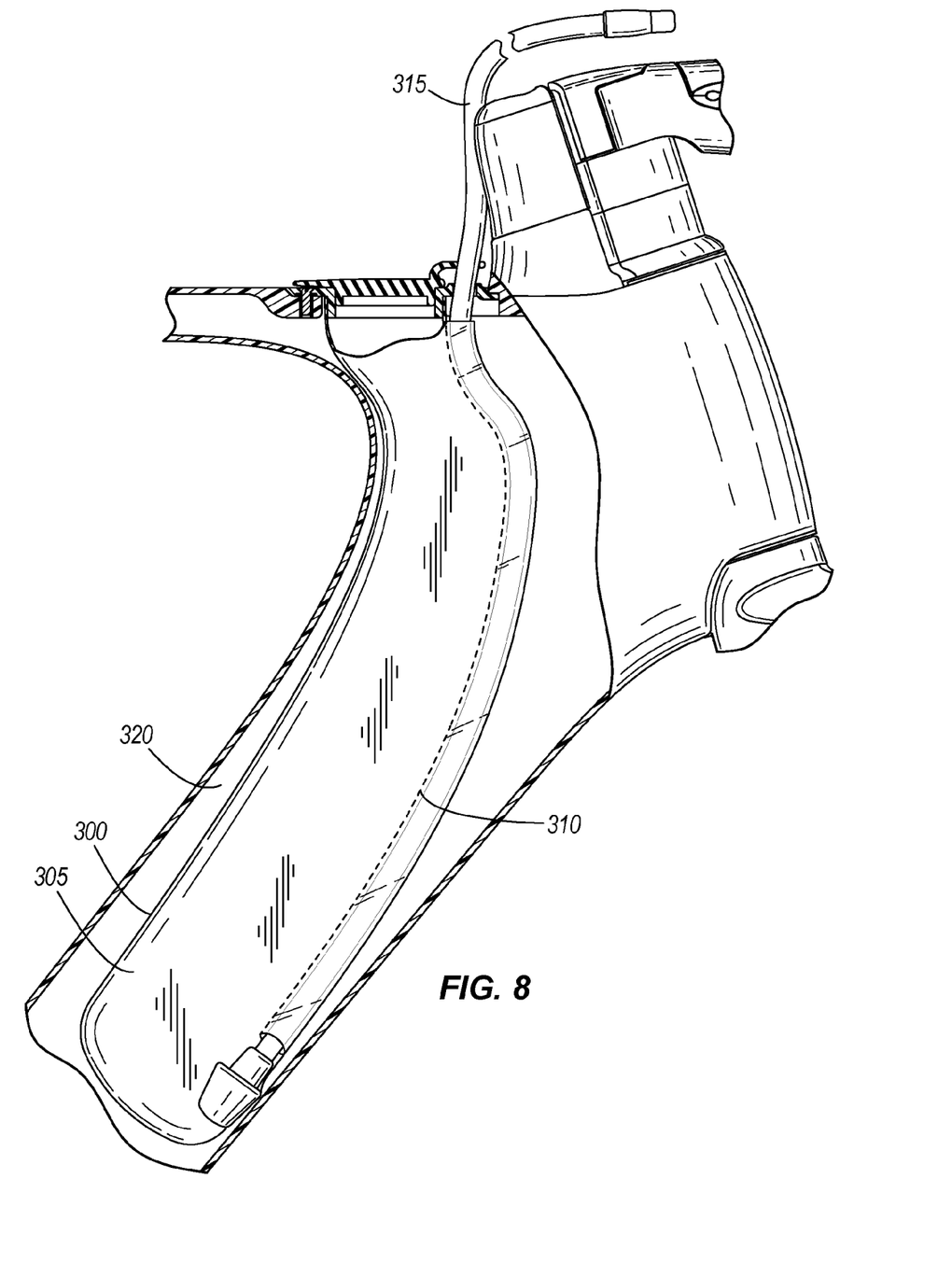
FIG. 8 is a sectioned side view of a front portion of the bicycle in FIG. 1, illustrating the internal storage system including a third construction of the storage system.

FIG. 8 illustrates a storage system 300 according to yet another embodiment. The storage system 300 includes a flexible bladder 305 having an integrally formed seam 310. A semi-rigid hollow tube 315 is positioned partially within the seam 310. In operation, the hollow tube 315 is positioned partially within the seam 310 of the bladder 305 and acts as a stiffening member, which assists pushing the bladder 305 into position within the internal storage system 320. The hollow tube 315 also serves as a drinking tube.

Various features and advantages of the invention are set forth in the following claims.

The invention claimed is:

1. A bicycle comprising:
   a front wheel;
   a rear wheel;
   a frame supported on the front and rear wheels, the frame including a hollow frame member having a wall with an opening; and
   a flexible bladder positioned in the hollow frame member.

2. The bicycle of claim 1, wherein the hollow frame member comprises a top tube of the frame.

3. The bicycle of claim 1, wherein the opening is in a top surface of the frame member.

4. The bicycle of claim 1, further comprising a stiffening member positioned along at least a portion of the bladder to facilitate insertion of the bladder through the opening and into the frame member.

5. The bicycle of claim 4, wherein the stiffening member comprises a hollow tube secured to a lower portion of the bladder.

6. The bicycle of claim 5, wherein an interior of the hollow tube is in communication with an interior of the bladder.

7. The bicycle of claim 5, wherein the hollow tube extends upward from the lower portion and protrudes from the frame member.

8. The bicycle of claim 4, wherein the stiffening member is coupled to the bladder along a majority of a length of the stiffening member.

9. The bicycle of claim 4, wherein the stiffening member is on an exterior of the bladder.

10. A bicycle comprising:
    a front wheel;
    a rear wheel;
    a frame supported on the front and rear wheels, the frame including a hollow frame member having a wall with an opening; and
    a storage system positioned in the hollow frame member and being removable from the hollow frame member.

11. The bicycle of claim 10, wherein the storage system comprises:
    a flexible bladder positioned in the hollow frame member and having an open end; and
    a collar coupled to the open end of the bladder, at least a portion of the collar being positioned on an outer surface of the frame member.

12. The bicycle of claim 11, wherein an outer surface of the collar is flush with an outer surface of frame member.

13. The bicycle of claim 11, wherein the collar is more rigid than the bladder.

14. The bicycle of claim 11, further comprising a hollow tube coupled to the bladder, wherein a portion of the hollow tube is positioned through an aperture in the collar.

15. The bicycle of claim 14, further comprising a cover closing the open end of the bladder, the cover including a retainer secured to the hollow tube.

16. The bicycle of claim 11, further comprising a cover movable relative to the collar between a closed position where the open end is substantially covered and an open position where the open end is substantially uncovered, wherein the cover is coupled to the collar in both the open and closed positions.

17. A bicycle comprising:
    a front wheel;
    a rear wheel;
    a frame supported on the front and rear wheels, the frame including a hollow frame member having a wall with an opening;
    a flexible bladder positioned in the hollow frame member and having an open end accessible through the opening, the bladder including a first portion adjacent the open end and generally aligned with a first axis extending through the open end and a second portion distal to the open end and generally aligned with a second axis that is non-parallel to the first axis.

18. The bicycle of claim 17, wherein the hollow frame member includes a top tube and the frame further includes a down tube, and wherein the bladder extends from the opening in the top tube and through at least a portion of the down tube.

19. The bicycle of claim 17, wherein the opening is in a top surface of the frame member.

20. The bicycle of claim 17, wherein a longitudinal edge of bladder is curved.

21. The bicycle of claim 17, a side profile of a front longitudinal edge of the bladder is convex.

22. The bicycle of claim 17, a side profile of a rear longitudinal edge of the bladder is concave.

23. A storage system for a bicycle including a hollow frame member having an opening, the storage system comprising:
    a flexible bladder positionable in the frame member; and
    a stiffening member positioned along at least a portion of the bladder to facilitate insertion of the flexible bladder through the opening and into the frame member.

24. The storage system of claim 23, wherein the flexible bladder has an open end and the storage system further comprises a collar coupled to the flexible bladder adjacent the open end to attach the bladder to the frame member.

25. The storage system of claim 24, wherein the flexible bladder includes a first portion disposed adjacent the open end and generally aligned with a first axis extending through the open end, and a second portion distal to the open end and generally aligned with a second axis that is non-parallel to the first axis.

* * * * *